(No Model.) 9 Sheets—Sheet 1.

E. L. MORGAN.
INDICATOR AND RECORDER.

No. 591,416. Patented Oct. 12, 1897.

WITNESSES:
Harry S. Arling
W. A. Redmond

INVENTOR
Edward L. Morgan
BY
J. F. Beale
ATTORNEY.

(No Model.) 9 Sheets—Sheet 3.

E. L. MORGAN.
INDICATOR AND RECORDER.

No. 591,416. Patented Oct. 12, 1897.

Fig. 6.

WITNESSES:
Harry S. Rohrer
W. A. Redmond

INVENTOR
Edward L. Morgan
BY
J. F. Beale.
ATTORNEY.

(No Model.) 9 Sheets—Sheet 4.

E. L. MORGAN.
INDICATOR AND RECORDER.

No. 591,416. Patented Oct. 12, 1897.

WITNESSES:
Harry S. Rohrer
W. A. Redmond

INVENTOR
Edward L. Morgan
BY
J. F. Beale.
ATTORNEY.

(No Model.)

E. L. MORGAN.
INDICATOR AND RECORDER.

No. 591,416.

Patented Oct. 12, 1897.

WITNESSES:
Harry S. Rohrer
W. A. Redmond

INVENTOR
Edward L. Morgan
BY
J. F. Beale
ATTORNEY.

(No Model.) 9 Sheets—Sheet 6.
E. L. MORGAN.
INDICATOR AND RECORDER.
No. 591,416. Patented Oct. 12, 1897.

WITNESSES:
Harry S. Rohrer
W. A. Redmond

INVENTOR
Edward L. Morgan
BY
J. F. Beale
ATTORNEY.

(No Model.)  9 Sheets—Sheet 7.
E. L. MORGAN.
INDICATOR AND RECORDER.

No. 591,416. Patented Oct. 12, 1897.

WITNESSES:
Harry S. Rohrer
W. A. Redmond

INVENTOR
Edward L. Morgan
BY
J. F. Beale
ATTORNEY.

(No Model.) 9 Sheets—Sheet 8.

E. L. MORGAN.
INDICATOR AND RECORDER.

No. 591,416. Patented Oct. 12, 1897.

WITNESSES:
Harry S. Arthur
W. A. Redmond

INVENTOR
Edward L. Morgan
BY
J. F. Beale
ATTORNEY.

(No Model.)   E. L. MORGAN.   9 Sheets—Sheet 9
INDICATOR AND RECORDER.

No. 591,416.   Patented Oct. 12, 1897.

*Fig. 27.*

WITNESSES:
Harry S. Rohrer
W. A. Redmond

INVENTOR
Edward L. Morgan
BY
J. F. Beale.
ATTORNEY.

UNITED STATES PATENT OFFICE.

EDWARD LAWRENCE MORGAN, OF LITTLE ROCK, ARKANSAS.

INDICATOR AND RECORDER.

SPECIFICATION forming part of Letters Patent No. 591,416, dated October 12, 1897.

Application filed November 18, 1896. Serial No. 612,564. (No model.)

*To all whom it may concern:*

Be it known that I, EDWARD LAWRENCE MORGAN, a citizen of the United States, residing at Little Rock, in the county of Pulaski and State of Arkansas, have invented certain new and useful Improvements in Indicators and Recorders; and I do hereby declare the following to be a full, clear, and exact description of the invention, such as will enable others skilled in the art to which it appertains to make and use the same.

The object of my invention is to provide a duplex indicator and recorder having two faces containing dials arranged on opposite sides, provided with dial-pointers operated simultaneously, so that the number or thing indicated will show on opposite sides or faces of the register.

It is also my object to provide a recording mechanism which will type-write on a paper ribbon each number or word indicated on the dials, affording a consecutive record of each transaction during an indefinite period of time.

It is also my object to provide a novel mechanism for operating a pointer or set of pointers which indicate the number or word and return to zero after each registration simultaneously with the return of the type-wheel corresponding to each set of dials.

It is also my object to provide a mechanism for operating two sets of dial-pointers having separate sets of dials, one set indicating dollars and words and the other set indicating fractions of a dollar or cents, the pointers for each set of dials being operated separately and provided with an alarm-bell distinct in tone.

It is also my object to provide two type-wheels, one of which corresponds to each set of dials, said wheels operating independently of each other, but simultaneously and in unison with their respective dial-pointers, each wheel printing a consecutive record in the dollar or cents column, respectively.

It is also my object to provide a spacing mechanism for the paper-feed spool to be automatically operated by the locking mechanism, causing a blank space to be left on the paper ribbon each time the register mechanism is unlocked, thus beginning a separate record each time the register is unlocked, which the conductor is compelled to make for his own protection when he leaves the car and locks the register.

It is also my object to provide a returning mechanism which, after the dial-pointers are turned to indicate and the gong sounded calling attention to the fact, will hold said pointers on the number indicated a sufficient time for an observer to read the number before the pointers are returned to zero.

It is also my object to provide an endless feed mechanism for the carbon ribbons which will also give automatically a lateral movement to the ribbon.

In the accompanying drawings, forming a part of this specification, I have shown my invention as applied to a railway-coach; but it is evident that its application is manifold. It is well adapted for a ferry-boat, or as a central indicator in an office or store and salesroom. It may be used without the telltale-dials, in which instance it would serve as a cash-indicator, when the locking mechanism may be omitted. In its application to a railway-coach the indicator is placed midway the length of the coach and connected by line-shafts operating telltale-dial pointers placed at each end of the same, so that regardless of the direction in which the passengers are facing one of the telltale indicator-dials and one face of the central or operating indicator will confront them. This is an important feature, as owing to the length of a passenger-coach it would be impracticable to have have dials large enough to be read more than half of said length.

Fig. 7ª is a detail view of a portion of the cam-shaft disk, showing relative position of its shoulder and stop.

Referring more particularly to the drawings, I will first describe the construction and operation of the indicator and recorder and afterward its application to a railway-coach.

1 denotes the casing of the indicator, to the bottom, top, and side walls of which the operating mechanism is attached, the front and back walls being removable for purposes of repair and adjustment.

2 denotes a door in the front wall of the casing for access to the paper ribbon.

3 denotes a horizontal platform secured to the sides of the casing, upon which part of the mechanism is supported.

4 denotes the dial for dollars, and for the purpose of a railway-coach is also marked with the words "Annual pass," "Punch pass," "Mileage-book," "Local ticket," "Through ticket," and "Half-fare."

5 denotes the dials for fractions of a dollar. There are four dials in all, making two pairs, each pair having a dial facing from opposite sides of the indicator. The numbers on the front dials read to the right and those on the opposite side read to left.

Figure 7:
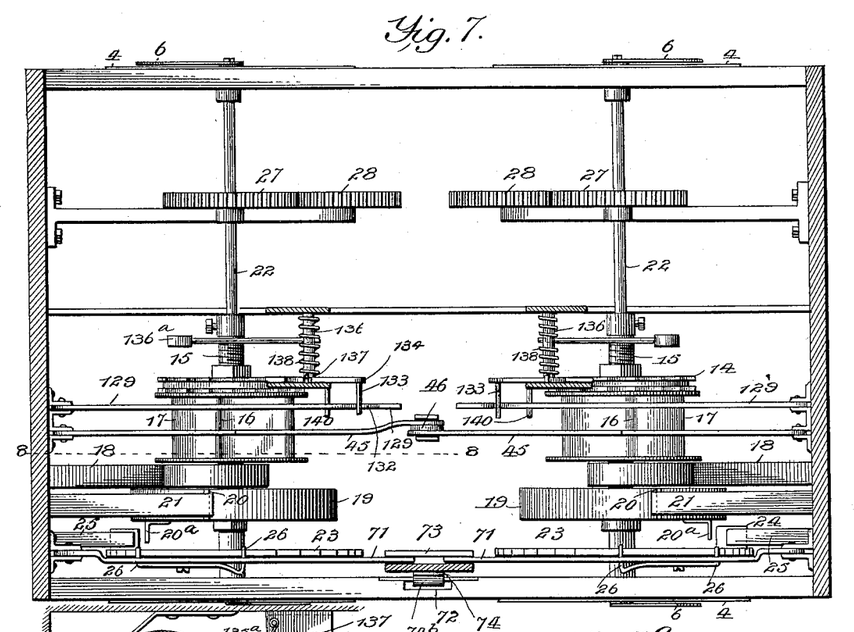
Fig. 7 is a section taken on the line 7 7 of Fig. 6.

6 denotes the dial-pointers, attached to opposite ends of two shafts, hereinafter described, said ends projecting through the front and back walls of the casing, as shown in Fig. 7. The pointers for the two dials marking dollars being on opposite ends of one shaft and those for the two dials marking cents on the other, a movement of either shaft will cause its corresponding dial-pointers to indicate simultaneously on both faces of the register.

7 7 denote two pairs of grooved pulleys, mounted loosely upon shafts 8. Each pair of pulleys has two cords 9, one cord passing around each pulley in its groove and fastened thereto. The free ends of said cords pass under guide-pulleys 10 and lead in opposite directions—two in front and two to the rear of the indicator.

Figures 7A, 9:
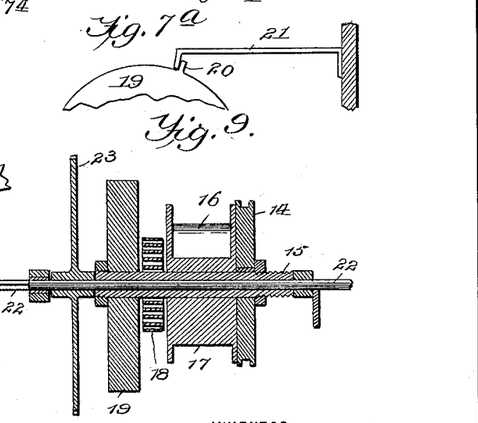
Fig. 9 is a vertical longitudinal section showing the cam-shaft, its attachments, and the relative position of the dial-pointer shaft.
Figures 8, 10:
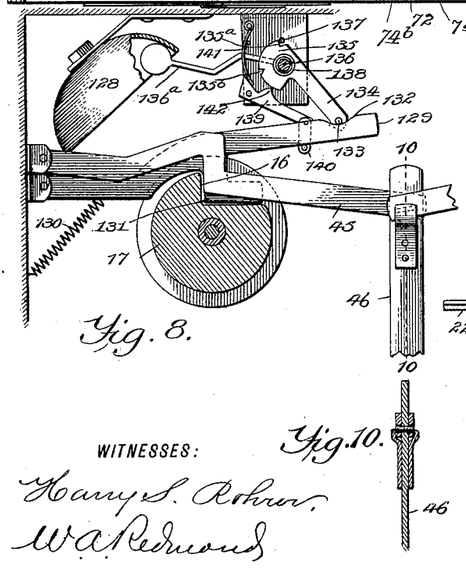
Fig. 8 is a section taken on the line 8 8 of Fig. 7, showing the mechanism for operating the gong-hammer, the vertical motor-rod, and horizontal levers.
Fig. 10 is a section on the line 10 10 of Fig. 8.

11 denotes housings over the grooves of each pulley to confine the cords in position. Between each pair of pulleys and fixed to said shafts 8 is a sprocket-wheel 12, (shown in Figs. 13 and 14,) provided with pins 12ª, which engage a lug 7ª on each of a pair of pulleys. 13 denotes sprocket-chains connecting said sprocket-wheel with a sprocket-wheel 14, secured to a hollow shaft 15. As shown in Fig. 7, there are two separate mechanisms for operating the dial-pointers and type-wheels, one on each side of the indicator, and therefore a description of one will suffice for both, the construction being identical. Said hollow shaft, to be hereinafter termed the "cam-shaft," has secured thereto said sprocket-wheel 14, an actuating-cam 17, hereinafter described, a main coiled spring 18, one end of which is secured to the side wall of the casing, and a cam-shaft disk 19, having a shoulder 20 on its periphery which engages a stop 21, secured to said casing, and also a lug 20ª, which engages a toothed disk hereinafter mentioned. Said cam-shaft is mounted upon and turns on a shaft 22, as shown in Fig. 9, known as the "dial-pointer shaft," to which is secured a toothed disk 23, having a stop 24, which engages a lug 25, secured to the casing wall, and also engages the lug 20ª. 26 denotes a pawl which engages the teeth of said disk, as hereinafter described. To the square ends of the dial-pointer shaft the dial-pointers are secured, the normal position of which pointers is the zero-marks on the front and rear dials. The cam 17, as shown in Figs. 8 and 9, is provided with a recess or detent 16 on its periphery, which normally is turned uppermost and which engages with a shoulder on a horizontal lever and a like shoulder on a hinged arm, as hereinafter described.

Figure 5:
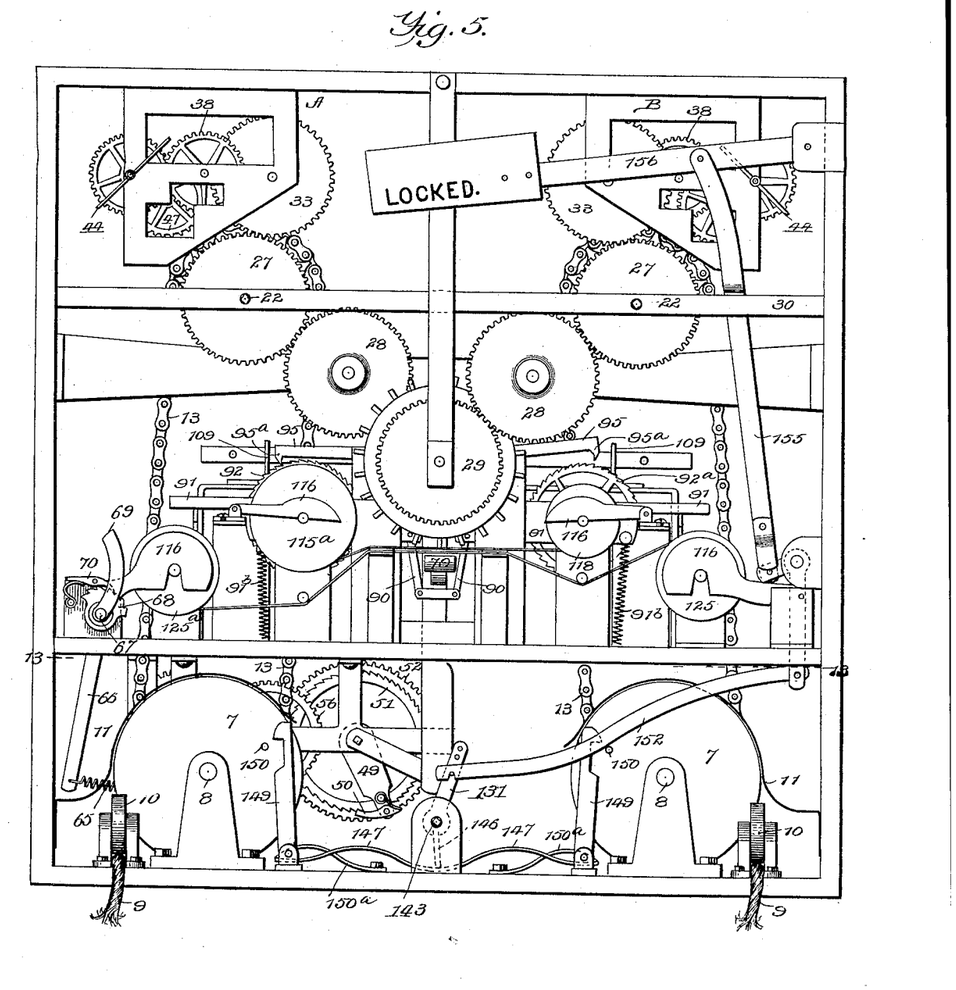
Fig. 5 is a front elevation of the operating mechanism of my indicator and recorder, the front wall of the casing, the dials, and dial-pointers being removed.
Figure 26:
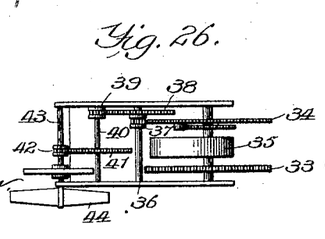
Fig. 26 is a plan view of one of the return-motors for dial-pointer shafts and type-wheels.

27 denotes two gear-wheels, each secured to one of the dial-pointer shafts, as shown in Fig. 5, and engage idle-wheels 28, which in turn engage two gears affixed to or forming part of each type-wheel 29 29ª. The ends of the two dial-pointer shafts are journaled on horizontal bars 30, crossing the front and rear sides of the casing, and the type-wheels, which are located just inside of the front wall of the casing, are loosely mounted on a fixed axle supported by a vertical bar 31 at one end and to a standard 32 at the other. The type-wheels are mounted side by side and are operated by the respective dial-pointer shafts, each wheel moving and printing independently of the other and revolving in an opposite direction. They carry on their peripheries the numbers corresponding to their respective dials, and as the dial-pointers are operated by pulling the cords 9 the type-wheel geared to the dial-pointer shaft turns simultaneously with said pointers and prints on a detachable paper ribbon, as hereinafter described, the number indicated by said pointers. Said shaft is then acted upon by a return-motor and returns said pointers and type-wheel back to zero, as hereinafter described. Said motors are designated in Fig. 5 as A and B, and a plan view of the same is shown in Fig. 26. They are identical in construction and a description of one will suffice for both.

33 denotes a gear-wheel which meshes with gear-wheel 27 on the dial-pointer shaft. 34 is a gear-wheel mounted on the same shaft with wheel 33. 35 is a coiled spring (shown in Fig. 26) secured to said shaft between said wheels. 36 is a shaft carrying a pinion 37, which meshes with wheel 34, and a gear-wheel 38, which meshes with a pinion 39 on shaft 40, which also carries gear-wheel 41, meshing with a pinion 42 on shaft 43, carrying a retarding fly-wheel 44. Said spring 35 is wound up by a pull on the cords 9, operating the dial-pointer shaft, which, through its gear-wheel 27, transmits its movement to the motor. When said cord is released, the spring effects a return movement of the dial-pointer shaft, which in turn moves the type-wheels back.

Figure 6:
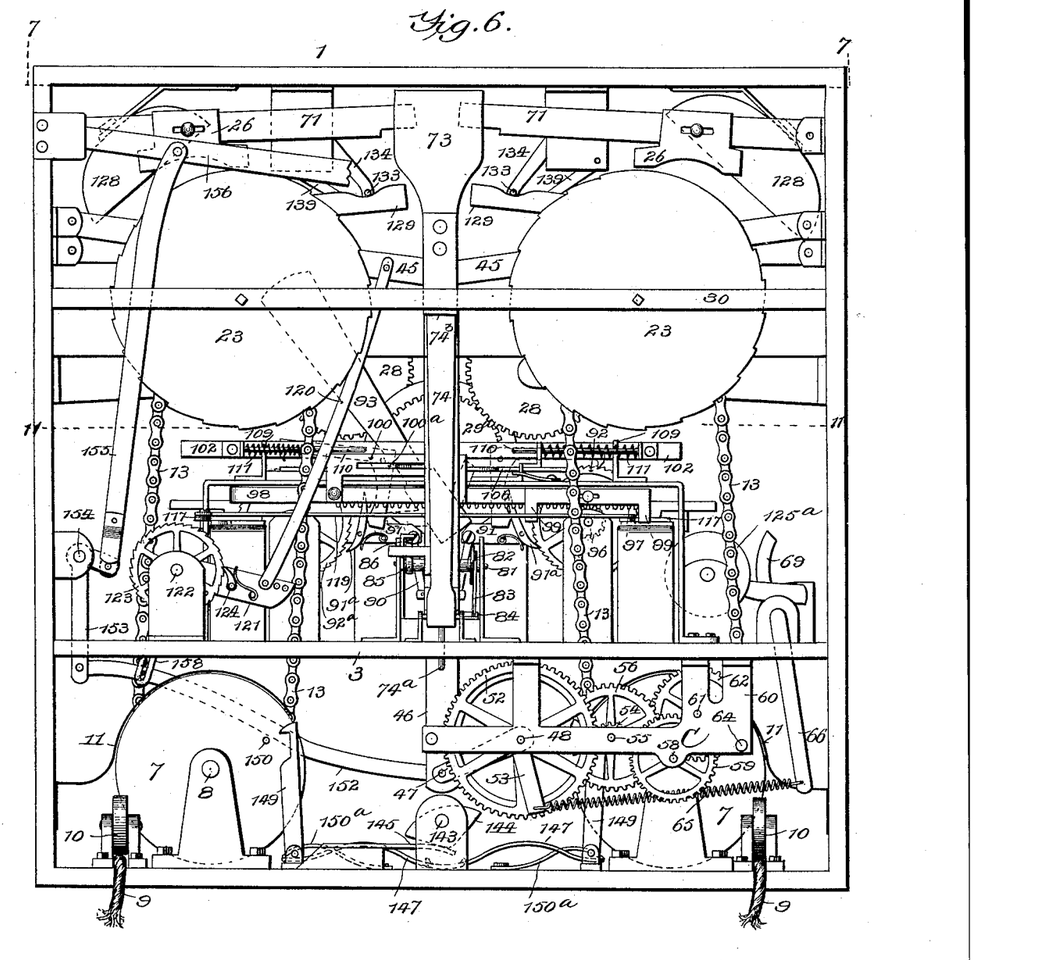
Fig. 6 is a rear elevation of the same with the rear wall and other like parts detached.

45 denotes two main horizontal levers (seen in Figs. 6, 7, and 8) pivoted at one end to the sides of the casing and extending inwardly to about the center of the same, where the inner ends are loosely mounted by means of slots upon opposite sides of a vertical motor-rod 46. Said levers are alike in construction. Each is formed with a bend giving upon its under side a vertical rise or shoulder, which fits into the detent on cam 17, and when the cam-shaft is revolved the cam-bearing upon the under side of the shoulder first lifts the lever by forcing the shoulder out of the detent. When the main spring 18 turns the cam-shaft back, the shoulder gradually sinks back into the detent and the further backward turn of the shaft is arrested by the shoulder 20 on disk 19 engaging the stop 21. This check to the return movement of cam-shaft occurs immediately before the beginning of the gradual descent of shoulder on lever 45 into said detent. The vertical motor-rod 46 extends down nearly to the bottom of the casing, as shown in Fig. 6, where it is connected to the main return-motor C, hereinafter described, by a crank-arm 47. The movement of said rod is a reciprocating vertical one, its upward movement being effected by pulling either one of the four cords, which in turn operates the cam-shaft, raises either horizontal lever, which in turn raises the motor-rod. The downward movement of said rod is effected by the main return-motor.

Figure 13:
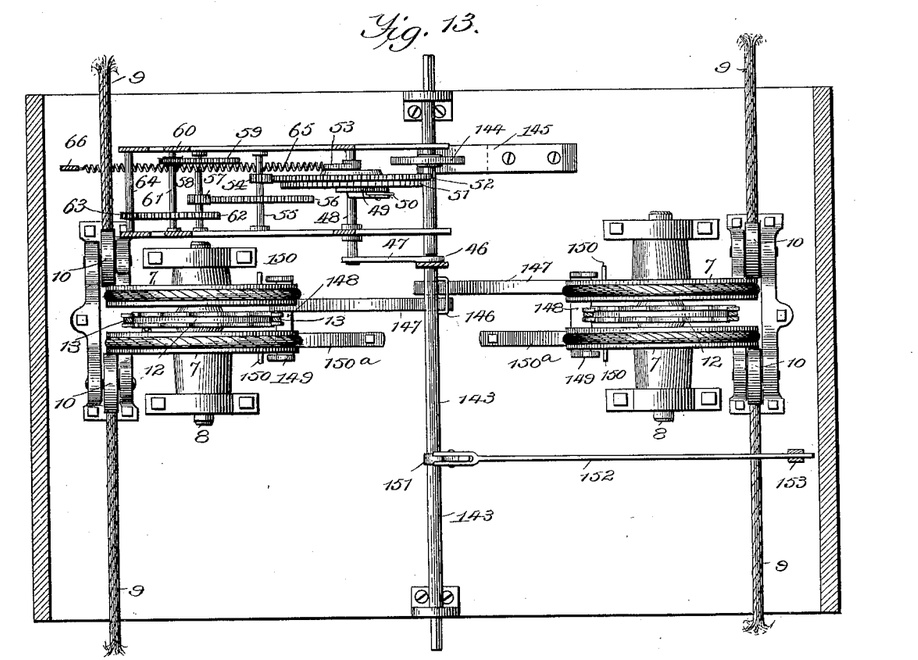
Fig. 13 is a section taken on the line 13 13 of Fig. 5.
Figure 14:
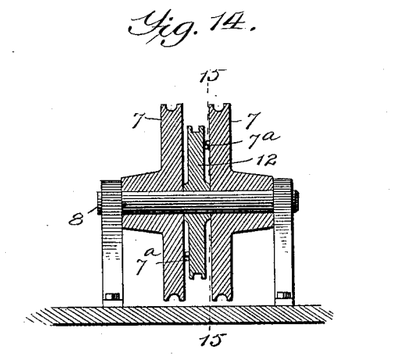
Fig. 14 is a longitudinal section through one of the grooved pulleys.
Figure 15:
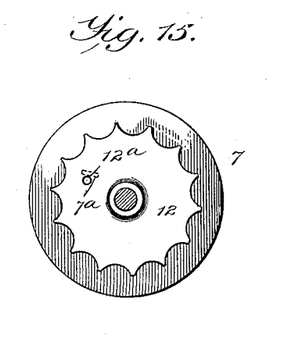
Fig. 15 is a section taken on the line 15 15 of Fig. 14.

C denotes the main return-motor, which, as shown in Figs. 6 and 13, is provided with a train of gear-wheels mounted in a frame hung to the under side of the platform. This motor consists of a rock-shaft 48, to which is rigidly secured one end of the crank-arm 47. 49 denotes another crank-arm attached to said shaft, its free end carrying a spring-actuated pawl 50, which engages with a ratchet-wheel 51, loosely mounted to said shaft. 52 denotes a gear-wheel loosely mounted to said shaft and rigidly secured to said ratchet-wheel.

53 denotes a crank-arm having a coiled spring attached to its free end, which spring is secured to a tension device hereinafter described. The gear-wheel 52 meshes with a pinion 54 on a shaft 55, which carries a gear-wheel 56, which in turn meshes with a pinion 57 on a shaft 58, carrying a gear-wheel 59, which meshes with a pinion 60 on shaft 61, carrying a gear-wheel 62, which in turn meshes with a pinion 63 on shaft 64.

65 denotes the coiled spring, one end of which is attached to the crank 53 and the other end to a crank-arm 66, secured to a rock-shaft 67, extending through to the front side of the casing, where it is provided, as shown in Fig. 5, with a segmental rack 68 and hand-crank 69, rigidly secured thereto. 70 denotes a spring-actuated pawl which engages the teeth of said rock. The tension of spring 65 is regulated by moving the hand-crank to the right or left. The train of gear-wheels of the main return-motor is operated to expand spring 65, which is accomplished by the upward movement of the vertical motor-rod 46 as it is lifted by the action of the cam 17 upon either horizontal lever 45. The operation is as follows: As rod 46 moves up it carries with it the attached end of crank 47, which partially rotates the rock-shaft 48, carrying with it crank 49, having pawl 50 and crank 53, which latter causes spring 65 to expand until the motor-rod 46 has attained the limit of its upward movement. When this occurs, the pawl 50, engaging with the ratchet-wheel 51, locks the train of gears to the rock-shaft, which shaft is then turned back by the tension of said spring upon its crank 53, which puts the train of gears in motion. The object of this train is to retard or graduate the action of the spring 65.

The functions of the vertical motor-rod 46 are threefold.

First. It acts through its attachments on the toothed disk 23 (see Fig. 6) as follows: 71 denotes two horizontal arms having locking catches or pawls 26, which engage the teeth of said disks. Said arms are pivoted to opposite side walls of the casing and extend about half-way across, where their free ends are supported in a bracket 73, secured to the upper end of a gravity-rod 74. This rod has a vertical movement, its downward movement being effected by its weight and the weight of said horizontal arm 71, while its upward movement is caused by the descent of said motor-rod, as hereinafter shown. Said gravity-rod is provided at its lower end with a short guide-rod 74ª, which rides in a perforation in the horizontal platform, and a guide-lug 74ᵇ, which plays in a recess 72, formed in the horizontal bar 30. It also has a step or lug 75 near its lower end which rests on one end of an arm 76, pivoted at its center on a bracket secured to the horizontal platform. The other end of said pivoted arm engages a lug 77 on the motor-rod. Said parts act as follows: When the motor-rod is raised, lug 77 allows the contacting end of the arm 76 to rise. The weight of the gravity-rod bearing down on the other end causes this end of said arm to fall. As the gravity-rod falls pivoted arm 71 (better shown in Fig. 6) falls with it, bringing the catches 26 in contact with the teeth on disks 23. The object of this action of the vertical motor-rod through the gravity-rod and pivoted arms 71 upon the toothed disks is to hold the dial-pointer shaft from turning backward, the pawl 26 passing over the teeth of said disk when said shaft is turned in the direction for registering, but will arrest a movement of said disk in the opposite direction. Said pawl is lifted from contact with said teeth by the motor-rod just as it completes its down movement, thereby releasing said shaft, which is then acted upon by its return-motor A or B.

Figure 16:
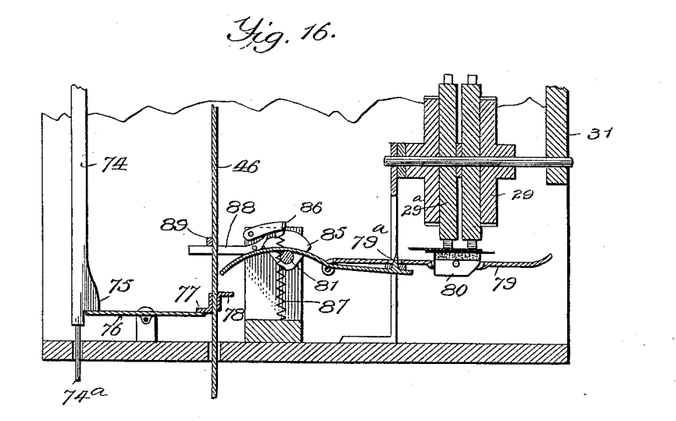
Fig. 16 is a section through the type-wheels, type-hammer, and means for operating the latter.
Figure 17:
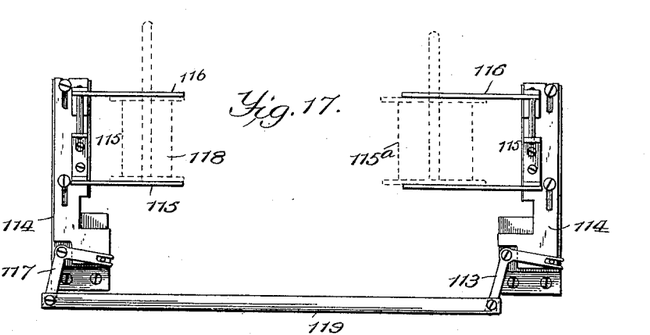
Fig. 17 is a detail view of the mechanism for operating the lateral movement of the carbon-spools.

Second. The motor-rod acts through its attachments on the type-hammer as follows: 78 denotes a lug secured to the front side of said motor-rod, which engages the rear end of the hammer-arm, as shown in Fig. 16. 79 denotes the hammer-arm, which is composed of two parts—an upper and lower part. The upper part is hinged to the lower, and the latter extends forwardly under the upper part, its forward end having a short guide-pin 79ª, which registers with a perforation in the upper part. The latter is slotted near its front end and provided with an oblong hammer 80, pivoted at its center and hung by a pivot-bolt in said slot. The lower part of the hammer-arm extends back until it meets the lug 78 on motor-rod, and near its rear end it is secured to a rock-shaft 81, carrying a coiled spring 82, (shown in Fig. 6,) which actuates said shaft. 83 is a stop secured to said shaft, which engages a lug 84, arranged below the shaft. 85 denotes a cam rigidly secured to said shaft, provided with a detent which engages a pawl 86, pivoted to one of the shaft-supports. 87 denotes a coiled spring fastened to said pawl, and 88 denotes a trigger pivoted to said shaft-support and normally bearing against the under side of said pawl. The trigger extends rearwardly until it is brought in contact with a lug 89, secured to the motor-rod. The type-hammer operates as follows: When the motor-rod is elevated, the lug 78 strikes the rear end of the hammer-arm, moves it up, and depresses its front end, causing the rock-shaft 81 to turn and wind its coiled spring. The cam 85 turns with the shaft until the pawl 86 engages its detent, which locks the shaft and holds the hammer down preparatory to making its upward stroke against the paper and type-wheel. As the motor-rod moves down the lug 89 strikes the trigger and releases the pawl. The shaft is instantly rocked by its spring and elevates the forward end of the type-hammer arm, causing the hammer to strike. To relieve the force of the blow and to prevent constant contact of the hammer with the paper is the purpose of the stop 83. The construction of the hammer-arm in two pieces and hinging them together is also of especial value in this respect, as it allows the outer end of the arm carrying the hammer to be swung or thrown upward, bringing the hammer in contact with the ribbon, after which it will fall slightly to its normal position below the same and not interfere with its movement.

Figure 11:
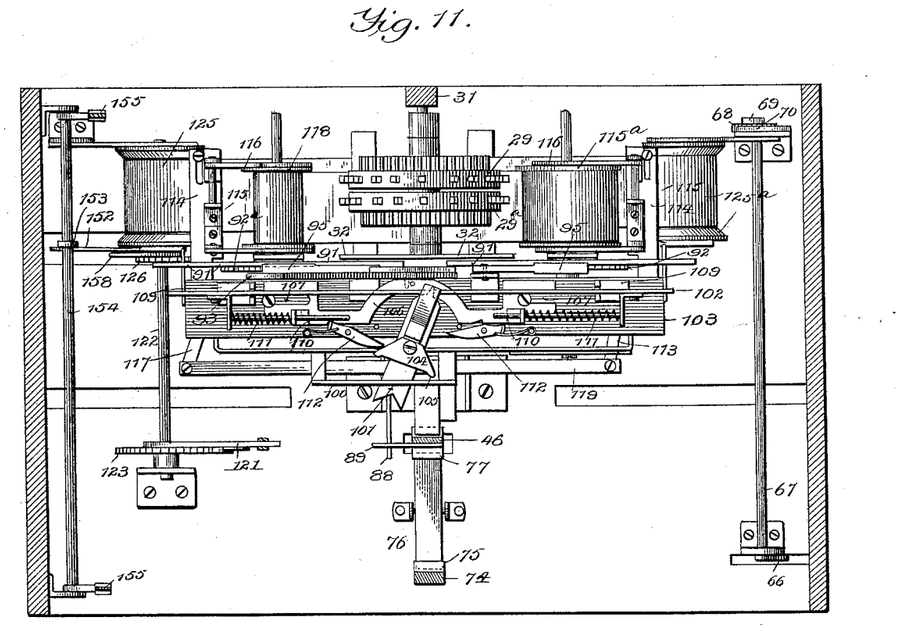
Fig. 11 is a horizontal section taken on the line 11 11 of Fig. 6.
Figure 12:
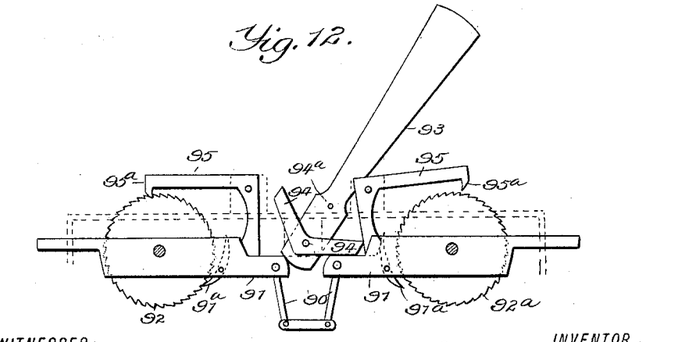
Fig. 12 is a view showing part of the reversing mechanism for the carbon-feed.
Figure 19:
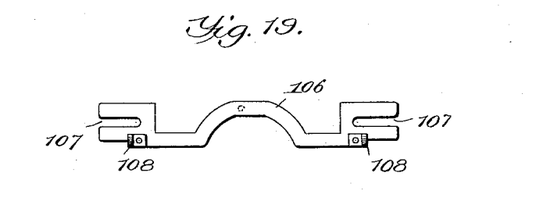
Figs. 19 to 22, both inclusive, are detail views of the several parts forming the mechanism for operating the carbon-feed.
Figure 20:
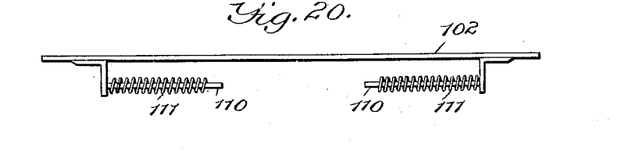
Figure 21:
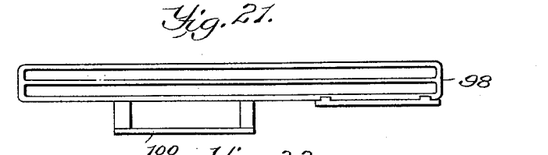
Figures 22, 23, 24, 25:
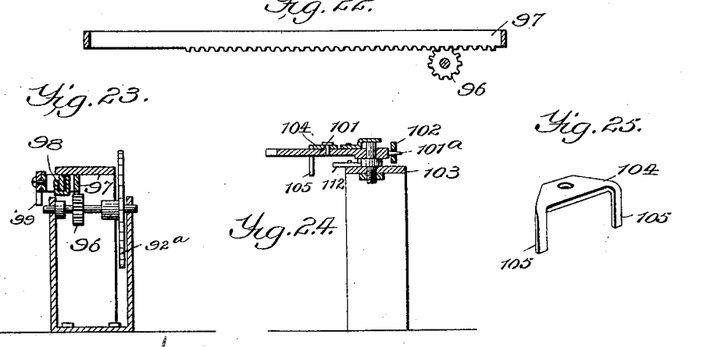
Fig. 23 is a cross-section showing the parts in Figs. 21 and 22 assembled.
Fig. 24 is a cross-section through the switch-lever 111, showing its pivotal attachment and its connection to the reciprocating frame shown in Fig. 20.
Fig. 25 is a detail view of the reciprocating frame 115.

Third. The vertical motor-rod, acting through its lug 78 upon the type-hammer, actuates the feeding mechanism for the spools carrying the carbon ribbon and provides means for automatically reversing the feed and also giving said ribbon a lateral movement and thereby changing its path relatively to the type-hammer, so that the latter will not wear the ribbon unevenly. This mechanism is shown in Figs. 6, 11, and 12. It consists of a yoke 90, having three jointed arms—one horizontal and two vertical. The latter are pivotally connected by their upper ends to two pivoted arms 91, each of which is provided with a trip-pawl 91ª and a coiled spring 91ᵇ. (Shown in Fig. 5.) 92 92ª denote two ratchet-wheels, which engage said pawls and throw the feed of the carbon ribbon either to the right or left, depending upon the throw of a counterbalance-arm 93. Said arm is shown as set to the right, looking from the rear, (see Fig. 12,) which throws the feed to the left-hand carbon-spool. It is provided at its lower end with a shoe 94, having two arms extending at an angle upon each side and also with a lug 94ª. 95 denotes two rectangular dogs pivoted at their angles and provided at one end with a locking-tooth 95ª, engaging said ratchet-wheels. The other or lower ends of said dogs are placed in the path of the arms of said shoe 94, which alternately bear upon each dog. The lower ends of the dogs are also placed in the path of the trip ends of pawls 91ª, which are actuated by springs to engage said ratchet-wheels and are disengaged therefrom when the lower ends of said dogs are forced against the trip ends of said pawls. 96 denotes a pinion on the shaft of the ratchet-wheel 92ª, which gears with a rack-bar 97, forming part of a horizontal reciprocating frame 98. (Shown in Figs. 6, 21, and 22.) Said frame is provided with two arms 99, which cause the lateral movement of the carbon-spools, and a yoke 100, having a slot 100ª, in which rests the free end of switch-lever 101, which serves to throw the counterbalance 93 and reverse the carbon-feed. I will first describe the construction and operation of the reversing mechanism and afterward that of the mechanism for effecting the lateral movement of the carbon ribbon. The lever 101 is provided with a lug 101ª, which engages a perforation in a horizontal reciprocating bar 102, hereinafter described. Said lever is pivotally mounted to a table 103, as shown in Figs. 11 and 24, and is provided near its free end with a yoke 104, having two tripping-arms 105. 106 denotes a reciprocating frame, (shown in Fig. 19,) having guideways 107 at each end, which play in suitable heads secured to said table. Said frame is arch-shaped at its middle and has a yoke upon its under side which engages the lug 94ª on the counterbalance. It is also provided with two perforated lugs 108. The reciprocating bar 102 (shown in detail in Fig. 20) is mounted in guideways 109, secured to said table 103, and said bar is provided at each end with lugs having projecting rods 110, over which are placed coiled springs 111, secured to said lugs at one end, the other or free end of which springs bears against lugs 108 alternately. The rods 110 pass through the perforations in the lugs 108. 112 denotes trip-pawls pivoted to said table 103, each pawl having a spring-pressed tooth at one end which engages a detent in the frame 106. The other or trip ends of said pawls are arranged in the path of the tripping-arms 105. The reversing mechanism operates as follows: The pinion carries the rack-bar to the right or left, moving the frame 98, with its yoke, until either end of the slot 100ª strikes the free end of the switch-lever 101. This causes the opposite end of said lever to move the bar 102 in the opposite direction, compressing one of the springs 111 until either side of the tripping-arm 105 trips one of the pawls 112 and releases its tooth from the frame 106. The coiled spring just compressed will then force frame 106 to move to the right or left, and in so doing carry with it the counterbalance, which, through the action of its shoe upon the dogs and pawls 91ª, reverses the feed. The lateral movement given the carbon-spools is effected by arms 99 of the frame 106 striking a bell-crank lever 113, pivoted to a reciprocating frame 114, having a carriage 115, which holds the carbon-spool 115ª. Both spools are mounted on splined shafts or spindles and adapted to move endwise on the same and are held in place by keepers 116, secured to said carriage. 117 is a similar bell-crank lever attached to similar carriage which holds carbon-spool 118. Said levers are connected by a rod 119. Hence the movement of one bell-crank moves the other simultaneously inward or outward, causing the spools to slide endwise on their spindles. It is evident that this movement will occur as often as the carbon-feed is reversed.

The paper-feeding mechanism consists of a rod 120, pivotally connected by its upper end to the main horizontal lever 45 on the left side of the casing, looking from the rear, (see Fig. 6,) its lower end being pivoted to a crank-arm 121, mounted on a rock-shaft 122, carrying a ratchet-wheel 123. 124 denotes a pawl secured to said crank-arm, which engages the teeth of said ratchet-wheel. The forward end of said shaft carries a paper-feed spool 125, in rear of which (see Fig. 18) is a ratchet-wheel 126, rigidly secured to said shaft, provided with a pawl 127. 125ª is the paper-supply spool. The parts operate as follows: As the cam 17 lifts the horizontal lever 45 the latter carries with it the connecting-rod 120, raising the crank-arm 121 and, actuating its pawl, turns the rock-shaft carrying the paper-feed spool. The purpose of the ratchet 126 is to prevent the spool turning back. It also serves to advance the paper-feed through the operation of the locking mechanism, as hereinafter described.

The gong-sounding mechanisms are shown in Fig. 8 and are operated by the cams 17. There are two gongs provided, one for the dollar-dials and one for the cents-dials. Said gongs are different in tone, the object of which is to distinguish by sound whether dollars or cents are being indicated. 128 denotes said gongs, the mechanism for operating which is placed on opposite sides of the register. As said mechanisms are identical in construction and operation, a description of one will suffice for both.

129 denotes an arm pivoted to the side wall of the casing, provided with a coiled spring 130 near its pivoted end. 131 denotes a shoulder on said arm similar in construction to the shoulder on the main horizontal lever, and in similar manner engages with and is elevated by cam 17. Near the free end of said arm, on its upper side, is a depression 132, in which rides a stud 133, secured to the lower end of an arm 134, forming part of a cam 135, secured to a rock-shaft 136, carrying a gong-hammer 136ª. The cam 135 is provided with a shoulder 135ª on its upper side, which normally bears against a stud 137, secured to one side of a supporting-bracket, which stud serves to hold said rock-shaft against the tension of a coiled spring 138, surrounding said shaft and fastened to the same at one end, while its other end is fastened to an opposite supporting-bracket. (Not shown.)

139 denotes a trigger provided at one end with a shoe 140, which impinges against the under side of the arm 129. The other end of said trigger bears against a spring 141, and near this end of the trigger it is provided with a tooth 142, which engages a detent 135ᵇ in said cam. The operation is as follows: As the pivoted arm is lifted it raises the arm 134 and turns the rock-shaft back against the tension of its spring, lowering the gong-hammer until the detent 135$^b$ engages the tooth on the trigger. When the return movement of the cam 17 brings its detent or recess under the shoulder 131 of said hinged arm, its spring 130 forces said shoulder down in said recess, lowering the free end of said arm and bringing its under side in contact with the shoe of said trigger, releases its tooth from the cam, and allows the spring on the rock-shaft to turn the same, moving the gong-hammer upward to make its stroke upon the gong.

Figure 18:
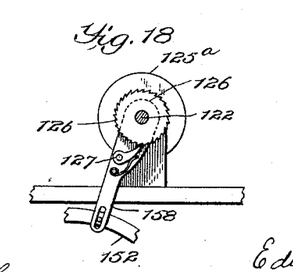
Fig. 18 is a detached view of the pawl and ratchet and attachments for connecting the paper-feed to the locking mechanism.
Figure 27:
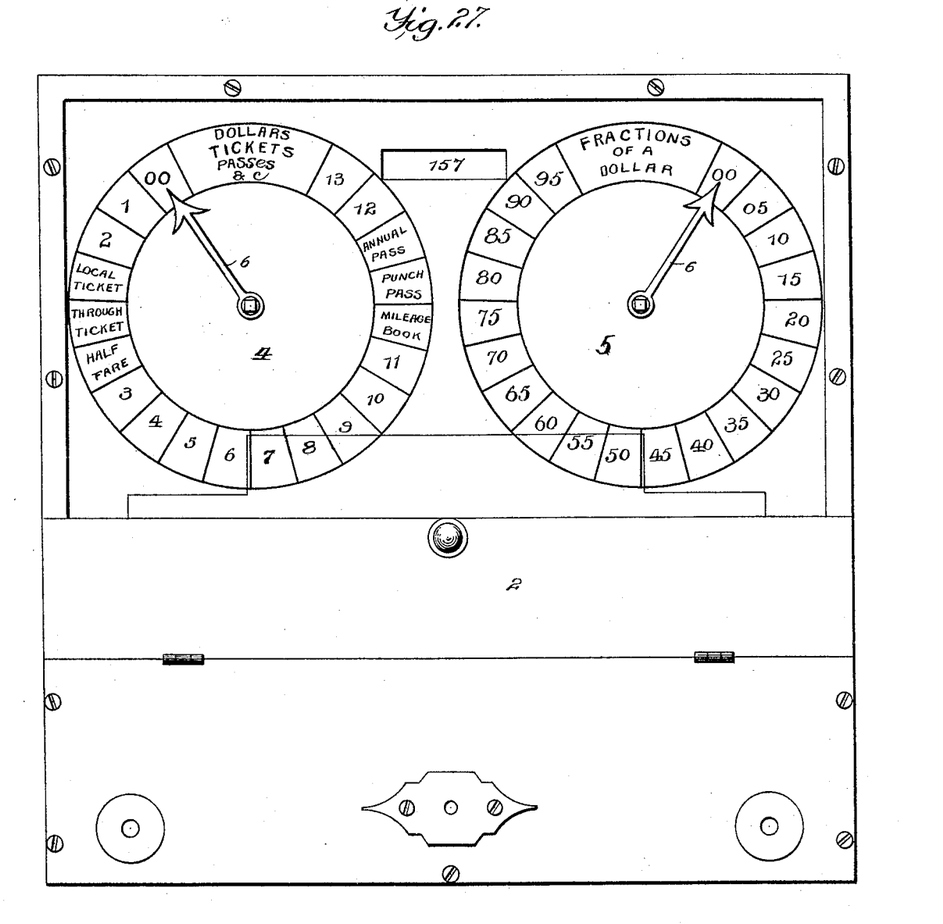
Fig. 27 is a front elevation of the indicator and recorder.

The mechanism for locking my indicator and recorder consists of a rock-shaft 143, extending across the center of the casing from front to rear, as shown in Fig. 13. 144 denotes a cam on said shaft, the periphery of which bears on a spring 145, the purpose of the cam and spring being to hold the shaft in the position it is turned. 146 denotes a lug secured to said shaft, which bears against two arms 147, connected to rocking yokes 148, having locking-arms 149, which engage stops 150 on the grooved pulleys, and thus lock the mechanism. 150$^a$ are springs which throw said arms in engagement. 151 denotes a crank-arm secured to said shaft 143 and pivoted to a connecting-rod 152, as shown in Figs. 5 and 13. Said rod is pivoted to a crank-arm 153, secured to a rock-shaft 154, (shown in Fig. 6,) which shaft also has two other short crank-arms at each end, which are pivotally connected to connecting-rods 155, and these rods are in turn pivotally connected to arms 156, pivoted to the upper right-hand side wall of the casing in front and rear, their free ends having secured thereto sign-boards bearing the word "Locked," which show through an opening in the front and rear wall of the casing, as shown in Fig. 27. The connecting-rod 152 also serves to operate a crank-arm 158, on which is secured the pawl 127, as shown in Fig. 18. Said crank-arm is mounted by a yoke at its lower end to a stud on rod 152. Its upper end is loosely mounted to the rock-shaft 122 and is adapted to rotate the shaft through its pawl 127 engaging the teeth of ratchet-wheel 126. The pawl 127 serves two purposes. It prevents the return movement of shaft 122, as before described, and also serves to rotate the rock-shaft and operate the paper-feed spool when the mechanism is unlocked.

The locking mechanism operates as follows: Unlocking the mechanism, for example, from the rear side the key is fitted to the projecting square end of the shaft and turned to the left, causing the lug 146 to bear downwardly on the two arms 147 and rock the shafts 148 backwardly. This throws the locking-arms out of engagement with the grooved pulley and unlocks the mechanism.

The paper-feed is advanced as follows: Simultaneously with said movement of shaft 143 the crank-arm operating the connecting-rod 152 actuates the crank-arm 158 and causes pawl 127 to engage the ratchet-wheel 126 and turn the paper-feed shaft 122, advancing spool 125.

The sign-boards are operated as follows: The connecting-rod 152 through its connection with the rock-shaft 154 also operates the sign-boards to show through the openings in the front and rear walls of the casing. As shaft 143 is turned to lock the register mechanism the connecting-rod moves shaft 154, lifting the rods 155, which in turn swing up the free ends of arms 156, having said boards attached, and the word "Locked" will then appear through said openings. As the mechanism is unlocked the sign-boards drop below said openings and said word is concealed.

In Figs. 1, 2, 3, and 4 I show my indicator and recorder attached to the interior of a railway-coach midway of its length and combine with it two telltale-indicators 159, one at each end of the coach.

Figures 1, 2, 3, 4:
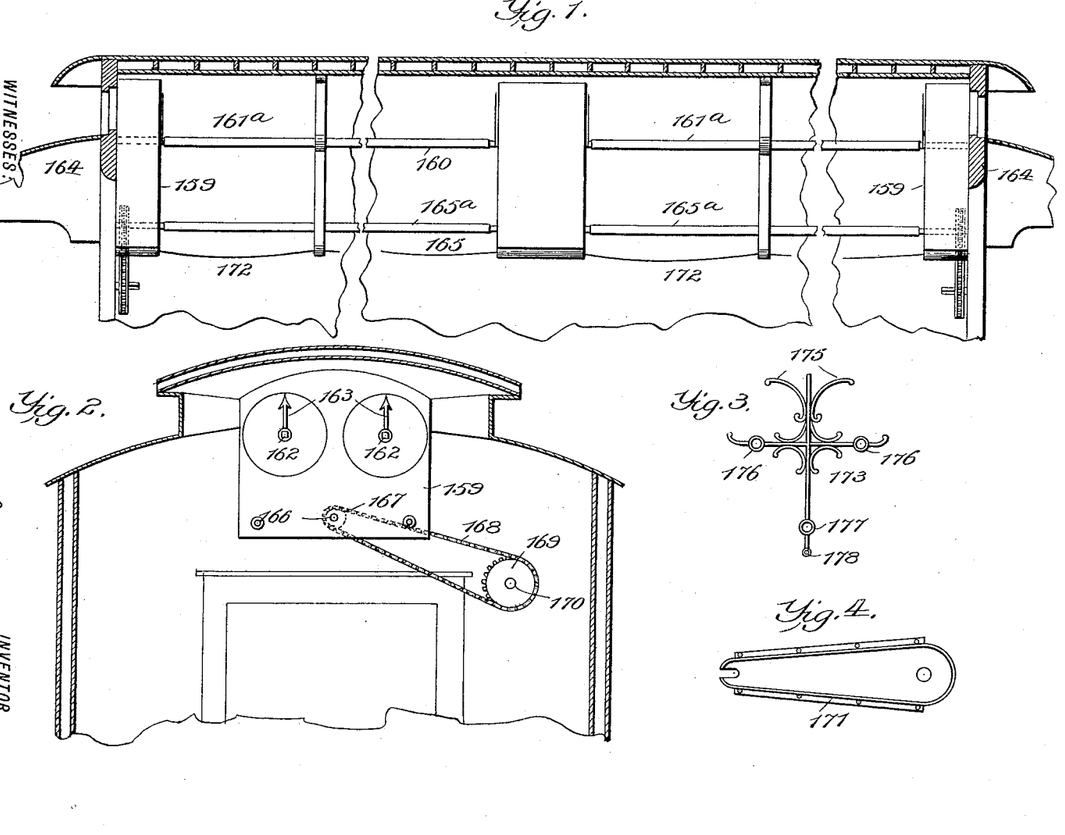
Figure 1 is a longitudinal section of the upper part of a railway-coach broken away near each end, showing my indicator and recorder, the telltale-indicators, the operating-shafts connecting the same, and the pull-cords.
Fig. 2 is a transverse section of the coach, showing a front elevation of one of the telltale-indicators in position.
Fig. 3 is a detail view of a hanger for the line-shafts.
Fig. 4 is a detail view of the casing for housing in the locking mechanism to the inner end walls of the coach.

160 denotes two parallel line-shafts for operating the dial-pointers of the several indicators, one shaft operating the dollar-pointer, and the other shaft, which is not shown, operating the cents-pointer. Each shaft is composed of two sections, as shown in Fig. 1, numbered 161$^a$, having square sockets at each end which register with the square end of the dial-pointer shafts of the main register, and the square-end arbors 162, which carry the dial-pointers 163 of the telltale-indicators. Said line-shafts thus practically extend through the central indicator carrying the dial-pointers on both faces of the same. 164 denotes a bracket for supporting said arbors.

165 denotes a locking line-shaft made up of two sections 165$^a$, similar in construction and in its connections with the several registers to the line-shafts for the dial-pointers. Said lock-shaft forms practically a continuous shaft extending through the main indicator by its union with each end of the rock-shaft 143 (shown in Fig. 13) and connected to arbors 166 in the telltale-dials. 167 denotes sprocket-wheels on said arbors, carrying sprocket-chains 168, which gear with sprocket-wheels 169, mounted on a key-arbor 170, secured in suitable bearings attached at each end of the car.

171 denotes a casing for housing the sprocket chain and wheel, provided with a keyhole for the arbor. This locking mechanism is operated from either end of the car by a turn on either key-arbor operating the lock-shaft and locking or unlocking the mechanism in the main or central indicator.

172 denotes two lines of cords extending from the main indicator, where they are secured to the grooved pulleys, before described, to the telltale-indicators, where their ends are made fast. Said cords are supported by suitable hangers suspended from the side walls of the car-cupola.

173 denotes a metal hanger. (Shown in detail in Fig. 3.) It is secured to the ceiling of the cupola by its arms 175, and is provided with side arms having bearings 176 for the line-shafts 161 and a depending arm having a bearing 177 for the lock-shaft and a perforation at its lower end for the usual bell-cord.

The general operation of my indicator and recorder is as follows: The mechanism being first unlocked, the paper-feed is actuated, separating the preceding account on the paper ribbon from the one about to be taken. A pull is then made on the cord, which operates the dollar or word dial-pointer to indicate and record the number of dollars or the words required. This is followed by a pull on the cord operating the pointer for cents. When the indicator is used for railway-coaches, it is placed midway of the same and the four cords leading from the register, two in front and two in the rear, form practically two cords, one at each side of the car, extending the entire length of the same and connected to the pulleys on corresponding sides of the main indicator front and rear, so that a pull on either cord will operate four dial-pointers, one on the front and back of the main indicator and one at each end of the car. The dial-pointers of the telltale-dials are turned by the line-shafts which are operated by the mechanism in the main indicator. As a cord is pulled the lug on the pulley 7 engages the lug on the corresponding side of the sprocket-wheel 12, rotating the same and through sprocket-chain 13 revolves the sprocket-wheel on the cam-shaft, which in turn coils its mainspring. This movement is continued until the lug on cam-shaft disk engages the lug on the toothed disk secured to the dial-pointer shaft, causing the latter to turn until the amount or word is indicated. As the dial-pointer shaft is turned the gear-wheel 27, carried thereby, operates the train of gears of the return-motors A or B and winds the spring 35, which actuates the return movement of said motor. Said wheel 27 at the same time (through the idle-wheel 28) turns the type-wheel corresponding to either dial-pointer shaft simultaneously. The cam-shaft performs its principal functions during the first fifth of its rotation, the remaining four-fifths of the same being transmitted to the dial-pointer shaft. During the first fifth of its rotation said shaft, by means of its cam 17, springs the gong-hammer and simultaneously, acting upon the main horizontal lever, transmits its motion to the vertical motor-rod, which through its attachments causes first the catches on the hinged arms to engage the toothed disk, and second, and almost simultaneously it operates the paper and carbon ribbon feeds by depressing the type-hammer arm and springs said arm preparatory to its blow upon the paper and type-wheel. The cam-shaft then acts upon the dial-pointer shaft, as before mentioned. When the cord is released, the mainspring returns said cam-shaft to its original position, where it is checked by the shoulder 20 on cam-shaft disk engaging stop 21. An interval is then allowed to note the number or word registered, at the beginning of which interval the gong-hammer is tripped and the gong sounded, calling attention to what is being registered by the dials. This interval is afforded while the main return-motor by its regulating train of gear-wheels is returning the reciprocating parts to their original positions, the last act of which is to raise the catches from the toothed disk and release the dial-pointer shaft, which is then actuated by the return-motor A or B, returning the dial-pointers to zero and the type-wheels to their normal poistion. The release of said shaft is immediately preceded by the motor-rod tripping the type-hammer.

The train of gear-wheels of the main return-motor retards the return movement of the reciprocating parts and affords a period of rest to the pointers after being set for the purposes before mentioned, as well as to allow time to pull or set the other pointers, when desired, before the former are released. This return-motor effects the return movement of all parts of the mechanism except the dial-pointer shaft and the type-wheels, which, as before mentioned, are returned to zero, or their normal position, by the motors A or B.

It is evident that instead of placing my indicator in the center of a car I may place it at either end of the same and dispense with one of the telltale-dials, in which case, there would be two operating-pulleys instead of four, and these would be fixed to their respective sprocket-wheels. Again, the indicator would have but one face, and the operating-shafts and lock-shaft would extend from it to the telltale-dial at the opposite end of the car. It is also evident that instead of connecting the dial-pointer shafts with the type-wheels by means of gear-wheels, as shown in Fig. 5, I may use a sprocket-chain, connecting a sprocket-wheel, fixed to said shafts, to a like wheel fixed to each type-wheel.

Having shown and described my invention, what I claim, and desire to secure by Letters Patent, is—

1. An indicator and recorder having two sets of duplicate dials facing upon opposite sides of the register each set having different units of value, two shafts one in common for each set of dial-pointers, type-wheels corresponding to each set of duplicate dials, connected to and operated by said shafts and means for actuating either set of dial-pointers and their corresponding type-wheel independently from either side of the register.

2. In a recording-indicator the combination of the dial, the pointer, a recording type-wheel corresponding to said dial, the dial-pointer shaft, and means for connecting said shaft and type-wheel whereby said pointer and wheel will turn in unison in either direction, first indicating and recording the required number or word and then automatically returning to zero.

3. An indicator and recorder having two dials, one marking dollars or words and the other cents provided with independently-operating pointers, two type-wheels corresponding to said dials and actuated independently of each other by the dial-pointer shafts to move in unison with said pointers and record side by side the number indicated on its corresponding dial in the dollars or cents column.

4. In a double-faced indicator the combination of the dial-pointer shaft extending to each face of the indicator and carrying pointers at each end, a shaft carrying two pulleys, means for connecting said shafts, and operating-cords for said pulleys' shaft leading from opposite faces of the register.

5. In an indicating and recording appliance the combination of the main indicator and recorder, the telltale-indicators located upon opposite sides of said main indicator and connected therewith by an operating line-shaft, a locking mechanism located in the main indicator connected by a locking line-shaft to said telltale-indicators, and means for connecting said lock-shaft to a key-arbor at either end of the car.

6. The combination of the cam 17, the horizontal lever actuated by said cam, the connecting-rod 120 pivoted to said lever, the crank-arm operated by said connecting-rod carrying a pawl, and the rock-shaft 122 having the paper-feed spool and a ratchet-wheel actuated by said pawl.

7. In an indicator the combination of the dial-pointer shaft having the toothed disk and the cam-shaft disk provided with lugs which engage lugs on said toothed disk, means for operating said shafts in common, and independent means substantially as described for effecting the return movements of said shafts at different intervals.

8. The combination of the dial-pointer shaft, a return-motor connected thereto and causing the return movement of the same, and a type-wheel operatively connected with the dial-pointer shaft and actuated simultaneously therewith.

9. In an indicator and recorder the combination of the dial-pointer shaft, the cam-shaft, the main horizontal lever, the type-wheel, the vertical motor-rod, means for effecting the downward movement of said rod, and a type-hammer operated by said rod substantially as described.

10. In a double indicator and recorder, the combination of the dial-pointer shaft, the cam-shafts, the horizontal levers pivoted to opposite sides of the casing, the vertical motor-rod connected to the free ends of said levers and having a return-motor at its lower end, the type-wheels, the type-hammer common to both type-wheels, and the return-motors A and B.

11. In a device for indicating and recording different units of value or words, the combination of the dial-pointer shafts, the cam-shafts, independent return-motors for said dial-pointer shafts, the two horizontal levers, a rod connecting one of said levers with the paper-feed shaft, the vertical motor-rod connected to said levers, a main return-motor for said motor-rod, a carbon-ribbon feed actuated by said motor-rod, and a spring-actuated hammer-arm sprung and tripped by said motor-rod.

12. The combination of the dial-pointer shaft having a toothed disk, the cam-shaft, a main horizontal lever, a vertical motor-rod, means for operating said lever and rod, a gravity-rod, and a hinged arm having catches which engage the teeth of said disk substantially as described.

13. The combination of the gong-hammer, the hinged arm connected therewith, the cam-shaft, the dial-pointer shaft, means for operating said shafts and independent means substantially as described for effecting the return movements of said shafts at different intervals, whereby after the gong is sounded the dial-pointer is held on the number or word registered for a given time before the pointer is returned to zero.

14. In a recording-indicator the combination of the vertical motor-rod, the type-hammer arm actuated by said rod, the jointed yoke actuated by said hammer-arm, the pivoted arms connected to the yoke and having actuating-pawls, and the ratchet-wheels operated by said pawls and actuating the carbon-spools substantially as described.

15. In a recording-indicator, the combination of the vertical motor-rod, the type-hammer arm actuated by said rod, the jointed yoke actuated by said arm, the pivoted arms connected to said yoke, the ratchet-wheels actuated by said pivoted arms, the trip-pawls, and means for actuating and tripping said pawls.

16. In a recording-indicator, the combination of the vertical motor-rod, the type-hammer arm, sprung and tripped thereby, the jointed yoke depressed by said arm, the pivoted arms connected to said yoke, the ratchet-wheels operated by said pivoted arms, the trip-pawls, the pivoted dogs, the counterbalance and means for automatically shifting said counterbalance to reverse the carbon-feed.

17. In a recording-indicator, the combination of the jointed yoke, the pivoted arms connected thereto, the ratchet-wheels on the carbon-spool shafts actuated by the trip-pawls, the counterbalance, the pinion on the carbon-spool shaft, the horizontal reciprocating frame having a rack-bar engaging said pinion, the pivoted switch-lever actuated by said frame, and the horizontal reciprocating rod actuated by said switch-lever to shift the counterbalance substantially as described.

18. The combination of the frame 106, the bell-cranks, a laterally-shifting carriage for the carbon-spools, means for connecting said bell-cranks, and means for operating said frame.

19. In a recording-indicator, the combination with the reversing mechanism for the carbon-spools, of a pivoted switch-lever, means for operating said lever, a horizontal bar actuated by said lever having coiled springs at each end, a reciprocating frame 114 actuated by said coiled springs and provided with tripping-pawls actuated by said switch-lever, and the counterbalance and means for shifting the same.

20. In a locking mechanism for registers the combination of the rock-shaft 143 having a key-arbor, a rock-shaft 148 connected to and operated by said first-named shaft, and locking-arms secured to the latter shaft adapted to engage and hold the grooved pulleys substantially as described.

21. The combination of the rock-shaft 143 extending to opposite sides of the indicator-casing having key-arbors at each end, a rock-yoke 148 upon each side of shaft 143 connected therewith and operated thereby provided with locking-arms engaging operating-pulleys connected to separate registering mechanisms.

22. The combination of the shafts 143, the rod 152 connected to said shaft, the arm 158 connected to said rod and carrying a pawl, the ratchet-wheel 126 actuated by said pawl, and the paper-feed shaft, whereby the locking mechanism operates the paper-feed when unlocked.

23. In an indicator and recorder, the combination of the cam-shaft, the main horizontal lever, the vertical motor-rod the jointed yoke actuated by said rod and operating the carbon-spools, the connecting-rod 120 connected to said motor-rod and the rock-shaft 122 carrying the paper-feed spool and operated by said rod 120.

In testimony whereof I affix my signature in presence of two witnesses.

EDWARD LAWRENCE MORGAN.

Witnesses:
  GEO. HARTMAN,
  L. H. BRADFIELD.